United States Patent
Kashiwagi et al.

(10) Patent No.: US 9,041,821 B2
(45) Date of Patent: May 26, 2015

(54) IMAGE COMPOSING APPARATUS FOR CONTINUOUSLY SHOOTING PLURAL IMAGES AND COMBINING THE PLURAL IMAGES

(71) Applicant: Casio Computer Co., Ltd., Shibuya-ku, Tokyo (JP)

(72) Inventors: Motoyuki Kashiwagi, Kodaira (JP); Kosuke Matsumoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 154 days.

(21) Appl. No.: 13/791,504

(22) Filed: Mar. 8, 2013

(65) Prior Publication Data

US 2013/0242121 A1   Sep. 19, 2013

(30) Foreign Application Priority Data

Mar. 12, 2012 (JP) ................................ 2012-054364

(51) Int. Cl.
*H04N 5/262* (2006.01)
*H04N 5/232* (2006.01)
(Continued)

(52) U.S. Cl.
CPC ......... *H04N 5/2621* (2013.01); *H04N 5/23264* (2013.01); *H04N 5/235* (2013.01); *H04N 5/365* (2013.01)

(58) Field of Classification Search
CPC . H04N 5/2621; H04N 5/23264; H04N 5/235; H04N 5/265; H04N 1/3872; H04N 1/3875; G06T 3/4038
See application file for complete search history.

(56) References Cited

U.S. PATENT DOCUMENTS 7,076,116 B2 * 7/2006 Horie ............................ 382/284
7,720,309 B2   5/2010 Sasaki et al.
(Continued)

FOREIGN PATENT DOCUMENTS

JP   2003-259184 A   9/2003
JP   2006-025312 A   1/2006
(Continued)

OTHER PUBLICATIONS

Japanese Office Action dated Nov. 19, 2013 (and English translation thereof) in counterpart Japanese Application No. 2012-054364.
(Continued)

*Primary Examiner* — Luong T Nguyen
(74) *Attorney, Agent, or Firm* — Holtz, Holtz, Goodman & Chick PC

(57) ABSTRACT

An image obtaining unit continuously obtains plural images each showing a moving subject and motionless subject. Dark current noise is removed from the plural images. Image portions of the moving subject are extracted from the plural images with noise removed, which image portions occupy different positions in the plural images, respectively. Image portions of the motionless subject are extracted from the plural images with noised removed, which image portions occupy the fixed positions in the plural images, respectively. The extracted image portions of the moving subject are moved in the plural images with noise removed based on the corresponding positions in the respective images. The moved image portions of the moving subject are combined with the mage portions of the motionless subject held at the fixed positions in the plural images with noise removed, whereby a shooting image is composed.

11 Claims, 7 Drawing Sheets

(51) Int. Cl.
*H04N 5/235* (2006.01)
*H04N 5/365* (2011.01)

(56) References Cited

U.S. PATENT DOCUMENTS

| | | |
|---|---|---|
| 7,856,174 B2 | 12/2010 | Tanaka et al. |
| 2006/0007327 A1 | 1/2006 | Nakamura et al. |
| 2006/0078224 A1* | 4/2006 | Hirosawa ............... 382/284 |
| 2007/0086675 A1* | 4/2007 | Chinen et al. .......... 382/284 |
| 2010/0145783 A1 | 6/2010 | Ono et al. |
| 2011/0043650 A1* | 2/2011 | Fukuyama ............. 348/220.1 |
| 2012/0242853 A1* | 9/2012 | Jasinski et al. ......... 348/222.1 |

FOREIGN PATENT DOCUMENTS

| | | |
|---|---|---|
| JP | 2007-089087 A | 4/2007 |
| JP | 2007-180734 A | 7/2007 |
| JP | 2007-281546 A | 10/2007 |
| JP | 4831248 B2 | 12/2011 |

OTHER PUBLICATIONS

Japanese Office Action dated Feb. 18, 2014 (and English translation thereof) in counterpart Japanese Application No. 2012-054364.

* cited by examiner

G1: the(n)-th

G2: the(n+1)-th

G3: G1 ⊖ G2

G4: G1 ⊕ G2

G5: G4 ⊖ G3

G6: G1 ⊖ G5/2

G7: G2 ⊖ G5/2

IMAGE COMPOSING APPARATUS FOR CONTINUOUSLY SHOOTING PLURAL IMAGES AND COMBINING THE PLURAL IMAGES

BACKGROUND OF THE INVENTION

1. Field of the Invention

The present invention relates to an image composing apparatus and a method of continuously picking up plural images and combining the plural images, thereby composing a shot image, and a recording medium.

2. Description of the Related Art

When shooting a subject giving weak light, such as a starlit sky, since conventional cameras need a long-time exposure, only images could be obtained, which show moving objects or stars falling or rotating around the earth. To solve such disadvantage of the conventional cameras, a technique was proposed by Japanese Unexamined Patent Publication No. 2003-259184, which performs image-pickup operations each with a short-time exposure to obtain plural images (hereinafter, referred to as the "successive-exposure image-pickup operation"), and shifts the plural obtained images by moving distances of the moving objects respectively to combine them together.

Using the above technique, plural images are combined together, whereby a shot image having necessary brightness and showing still objects can be obtained.

SUMMARY OF THE INVENTION

According to one aspect of the invention, there is provided an image composing apparatus, which comprises an image obtaining unit for continuously performing image-pickup operations plural times to obtain plural images each showing a moving subject and a motionless subject, a first extracting unit for extracting image portions of the moving subject from the plural images obtained by the image obtaining unit, which image portions occupy different positions in the plural images respectively, a second extracting unit for extracting image portions of the motionless subject from the plural images obtained by the image obtaining unit, which image portions occupy fixed positions in the plural images respectively, and an image composing unit for moving the image portions of the moving subject extracted by the first extracting unit in the plural images depending on the corresponding positions occupying in said plural images and holding the image portions of the motionless subject extracted by the second extracting unit at the fixed positions in the plural images, and for combining the moved image portions of the moving subject with the image portions of the motionless subject held at the fixed positions to compose a shooting image.

According to another aspect of the invention there is provided an image composing method in an apparatus having an image obtaining unit for continuously performing image-pickup operations plural times to obtain plural images each showing a moving subject and a motionless subject, the method, which comprises a first step of extracting image portions of the moving subject from the plural images obtained by the image obtaining unit, which image portions occupy different positions in the plural images, respectively, a second step of extracting image portions of the motionless subject from the plural images obtained by the image obtaining unit, which image portions occupy fixed positions in the plural images respectively, and a third step of moving the image portions of the moving subject extracted at the first step in the plural images depending on the positions occupying in said plural images and holding the image portions of the motionless subject extracted at the second step at the fixed positions in the plural images and of combining the moved image portions of the moving subject with the image portions of the motionless subject held at the fixed positions to compose a shooting image.

According to other aspect of the invention, there is provided a computer readable recording medium mounted on an image composing apparatus, wherein the image composing apparatus is provided with a computer and an image obtaining unit for continuously performing shooting operations plural times to obtain plural images each showing a moving subject and a motionless subject, the recording medium having recorded thereon a computer program when read and executed to make the computer implement a method, which comprises a first step of extracting image portions of the moving subject from the plural images obtained by the image obtaining unit, which image portions occupy different positions in the plural images, respectively, a second step of extracting image portions of the motionless subject from the plural images obtained by the image obtaining unit, which image portions occupy fixed positions in the plural images respectively, and a third step of moving the image portions of the moving subject extracted at the first step in the plural images depending on the corresponding positions occupying in said plural images and holding the image portions of the motionless subject extracted at the second step at the fixed positions in the plural images, and of combining the moved image portions of the moving subject with the image portions of the motionless subject held at the fixed positions to compose a shooting image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
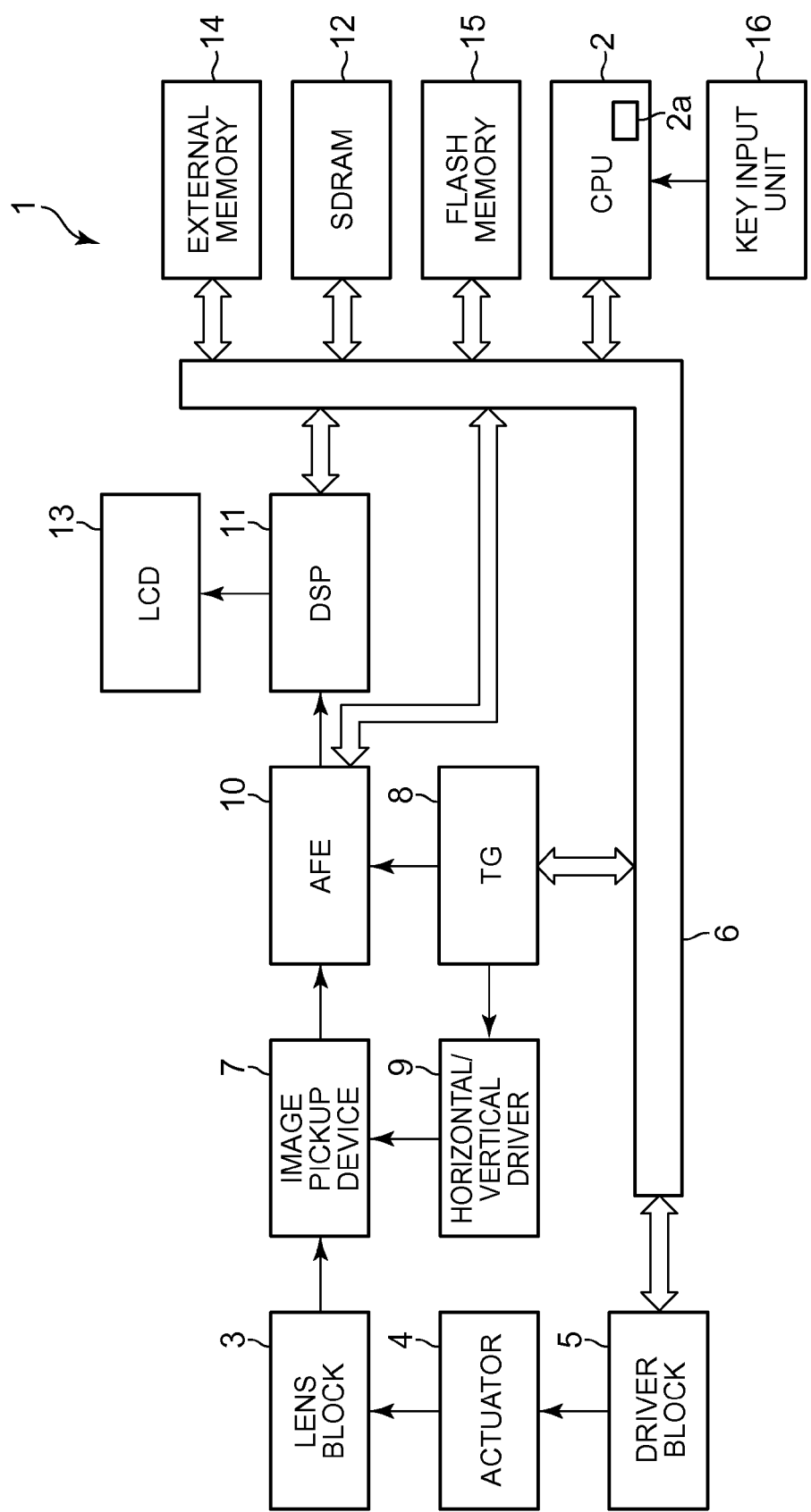
FIG. 1 is a block diagram of a schematic configuration of a digital camera used as an image composing apparatus according to the present invention.

Now, the embodiments of the present invention will be described with reference to the accompanying drawings. FIG. 1 is a block diagram of a schematic configuration of a digital camera used as an image composing apparatus according to the present invention.

The digital camera 1 according to the embodiments of the invention has CPU (Central Processing Unit) 2, which controls the whole operation of a system of the digital camera 1. Further, CPU 2 includes a built-in clock having a calendar function for counting a current date and time.

The digital camera 1 is provided with a lens block 3, which comprises an optical system including a focus lens and a mechanical shutter, and an actuator 4, which includes motors for driving the optical system and the mechanical shutter, respectively. A driver block 5 consisting of various drivers for driving the actuator 4 is connected to a bus 6.

Further, the digital camera 1 has an image pickup device 7 such as CCD (Charge Coupled Device) and/or CMOS (Complementary Metal Oxide Semiconductor) serving as image pickup means. The image pickup device 7 is driven by a horizontal/vertical driver 9 in accordance with a vertical timing signal, a horizontal timing signal, and an electronic shutter timing signal generated by TG (timing generator).

When driven by the horizontal/vertical driver 9, the image pickup deice 7 executes a photoelectric conversion on an optical image (object image) of an object focused on the optical system of the lens block 3, and supplies an analog image-pickup signal to AFE (Analog Front End) 10.

The AFE 10 comprises CDS (Correlated Double Sampling), PGA (Programmable Gain Amplifier), and ADC (Analog-to-Digital Converter). The AFE 10 serves to perform a CDS process on the analog image-pickup signal to remove noises and to convert the analog signal into a digital image-pickup signal. The digital image-pickup signal is supplied to DSP (Digital Signal Processor) 11.

The DSP 11 converts the received image-pickup signal into RGB data and further converts the RGB data into YUV data consisting of a luminance (Y) component and color-difference (UV) components. Further, the DSP 11 performs a digital signal process (including white balance, contour enhancement, and pixel interpolation) on the YUV data to enhance an image quality, and successively stores the processed data in SDRAM 12.

In a shooting mode, every time YUV data (image data) of one frame (one image) is stored in SDRAM 12, YUV data is sent to and displayed as a live view image on a liquid crystal display monitor (LCD) 13. When a shutter is pressed to take a picture, CPU 2 compresses YUV data to be temporarily stored in SDRAM to produce an image file in a predetermined format and stores the produced image file in an external memory 14. The external memory 14 is a detachable memory card installed on and connected to the camera body through a card-interface (not shown).

In a reproducing mode, when a user selects an image file from among image files stored in the external memory 14, CPU 2 reads and expands the image file as YUV data on SDRAM 12 to display said data on the liquid crystal display monitor 13.

A flash memory 15 serves as a program-storing memory for storing plural sorts of programs and data used for CPU 2 to control the whole operation of the digital camera 1. The programs stored in the flash memory 15 include controlling programs used by CPU 2 to perform AF (auto focus) controlling operation, AE (auto Exposure) controlling operation, AWB (Auto White Balance) controlling operation, and other process to be described.

A key input unit 16 comprises plural operation keys including the shutter key and a mode switching key used for switching the fundamental operation mode of the digital camera 1 from the shooting mode to the reproducing mode, and vice versa, and also used to select one mode from among plural specific modes in the shooting mode. A key operated condition of the key input unit 16 is always watched by CPU 2.

Under the shooting mode of the digital camera 1 according to the present embodiment, a starlit-sky shooting mode is prepared, in which mode a starlit sky is shot with the digital camera 1 held with a tripod and the like. In the starlit-sky shooting mode, CPU 2 runs the program stored in the flash memory 15 to perform the following process.

The process performed by CPU 2 in the starlit-sky shooting mode will be described in outline. In the starlit-sky shooting mode, CPU 2 performs one image-pickup operation with plural sequential short-time exposures ("successive-exposure image-pickup operation") depending on the brightness of a subject to obtain plural images, and further performs an image combining process for combining the obtained plural images together to produce and record a final shot image.

Figure 2:
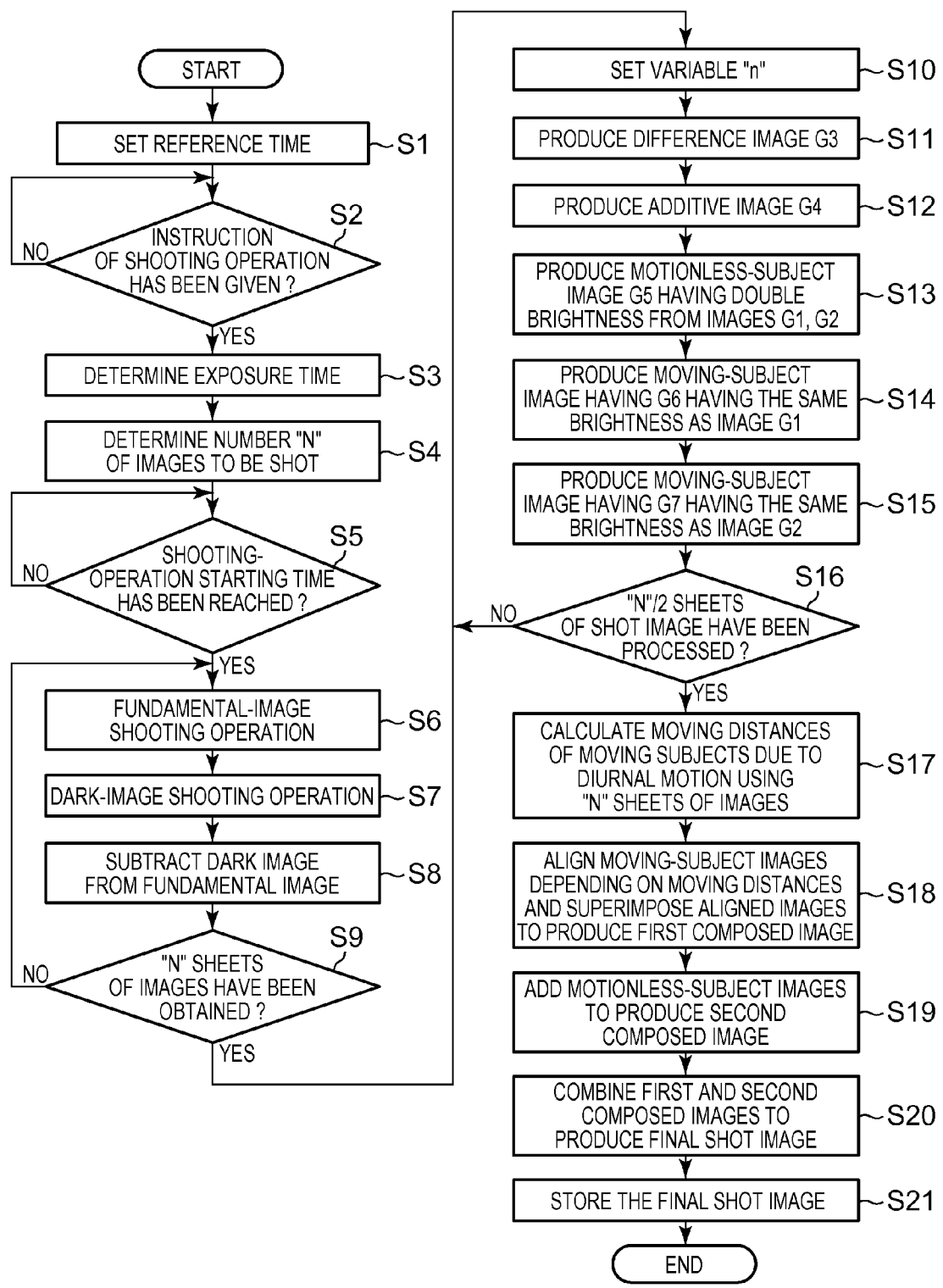
FIG. 2 is a flow chart of a process performed in a starlit-sky shooting mode set in the digital camera.

Now, the specific process performed by CPU 2 in the starlit-sky shooting mode will be described in accordance with a flow chart of FIG. 2.

When the user sets the starlit-sky shooting mode, CPU 2 starts the process and sets a reference time (step S1). The reference time is a shooting time when an image is shot, which image is used as a reference image when the plural images are combined together to obtain the final shot image. The user operates a predetermined key to set the reference time. The reference time is not limited to a real clock time but can be a shooting-operation starting time, a shooting-operation finishing time and a relative time counted from the shooting-operation starting time, including "n" minutes or "n" hours ("n" is an arbitrary value) after the shooting-operation starting time.

Then, CPU 2 stands by for an instruction of shooting operation, which the user will give pressing a shutter key (NO at step S2. When the instruction of shooting operation has been given (YES at step S2), CPU 2 determines an exposure time (whole exposure time) for obtaining an optimum exposure under AE controlling operation (step S3).

Further, CPU 2 determines the number "N" of images to be shot, depending on the whole exposure time determined at step S3 (step S4). When determining the number "N" of images to be shot, CPU 2 divides the whole exposure time "T" by a predetermined unit exposure time "t" to obtain a quotient "T/t", and determines that the number "N" of images to be shot is given by the quotient "T/t".

The predetermined unit exposure time "t" is a short exposure time, which is inevitably contained in the whole exposure time for shooting the plural images and is previously determined in order to suppress a dark-current noise generating in the image pickup device 7.

Thereafter, CPU 2 stands by until the shooting-operation starting time is reached (NO at step S5), and when the shooting-operation starting time has been reached (YES at step S5), CPU 2 starts repeatedly performing the processes at step S6 to step S8 to obtain "N" sheets of shot images.

The shooting-operation starting time corresponds to the reference time set at step S1. For example, if the reference time has been set to a specific clock time, then the shooting-operation starting time will be such specific clock time. Further, when the reference time is set to the shooting-operation starting time or the shooting-operation finishing time, the shooting-operation starting time will be the time when CPU 2 starts performing the process at step S5, that is, the present time. In this case, CPU 2 starts performing the processes at step S6 to step S8.

If the reference time has been set to the relative time counted from the shooting-operation starting time, that is, "n" minutes or "n" hours after the present time, the shooting-operation starting time can be set to "n" minutes or "n" hours after the present time, or to a time preceding the time set at "n" minutes or "n" hours after the present time by a period of the whole exposure time.

When the shooting-operation starting time has been reached, CPU 2 starts performing a series of processes immediately. The series of processes include a fundamental-image shooting operation (step S6) of obtaining a fundamental image, a dark-image shooting operation (step S7) of obtaining a dark image, and an image subtracting operation (step S8) of subtracting the dark image from the fundamental image to produce and record a resultant image.

Figure 3A:
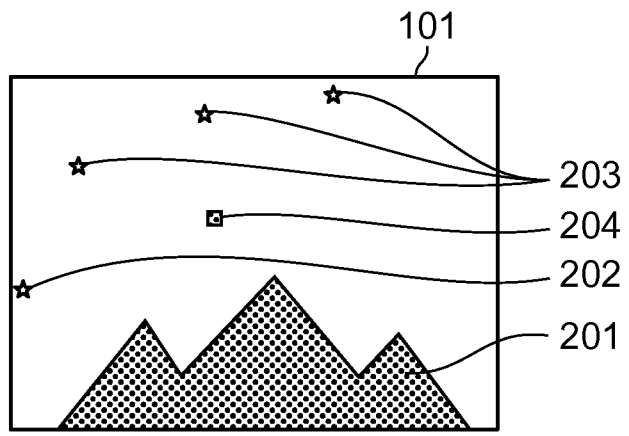
FIG. 3A is a view showing an example of a fundamental image obtained in the process at step S6 in the flow chart of FIG. 2.

The process of step S6 is performed to obtain a normal shot image (hereinafter, the "fundamental image") exposed for a unit exposure time, as described above. FIG. 3A is a view showing an example of the fundamental image 101 obtained in the process at step S6. The fundamental image 101 consists of a mountain (scene) 201 and the Pole Star 202, both of which do not move with time, and other stars 203, which move around the earth (diurnal motion, or the daily motion of stars), and further an inevitable dark-current noise 204.

In practice, dark-current noises 204 are found at several positions scattered about in the fundamental image 101, but as described above, since the predetermined unit exposure time is short enough in the present shooting operation of obtaining the fundamental image 101, the dark-current noise 204 will be a fixed pattern noise of a reproducibility.

Figure 3B:
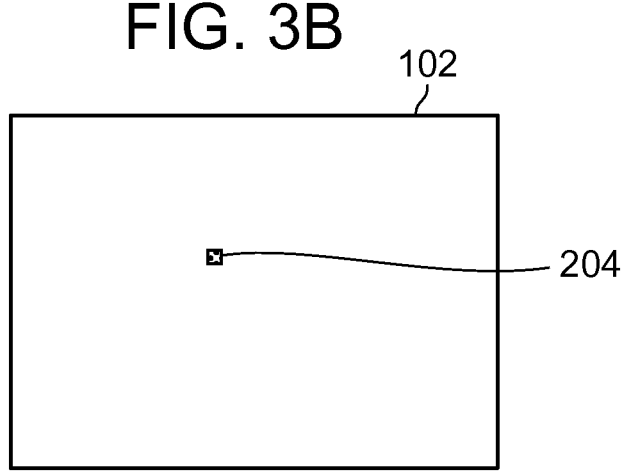
FIG. 3B is a view showing an example of a dark image obtained in the process at step S7 in the flow chart of FIG. 2.

The dark-image shooting operation of step S7 is a process, in which the image pickup operation is performed with a mechanical shutter (not shown) of the lens block 3 closed to obtain a noise image (hereinafter, the "dark image") consisting only of a noise component. FIG. 3B is a view showing an example of the dark image 102 obtained in the process at step S7. In the dark image 102, only the dark-current noise 204 appears but other subjects in the fundamental image 101 cannot be seen.

Figure 3C:
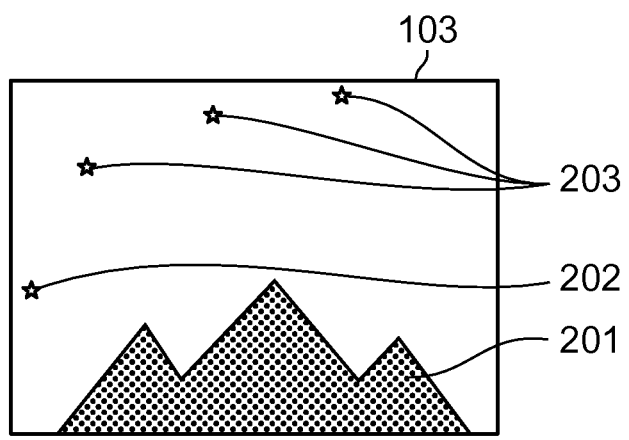
FIG. 3C is a view showing an example of an image with noise removed, obtained in the process at step S8 in the flow chart of FIG. 2.
Figure 4A:
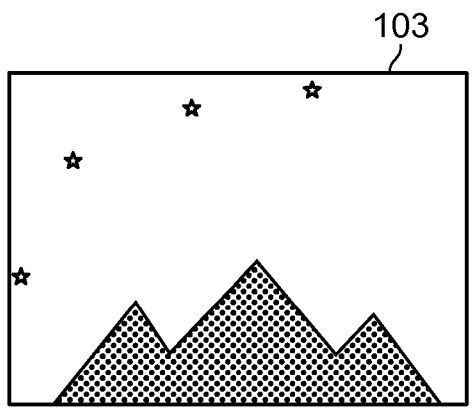
FIG. 4A to FIG. 4F are views showing plural stars, which change their positions in the respective images.
Figure 4B:
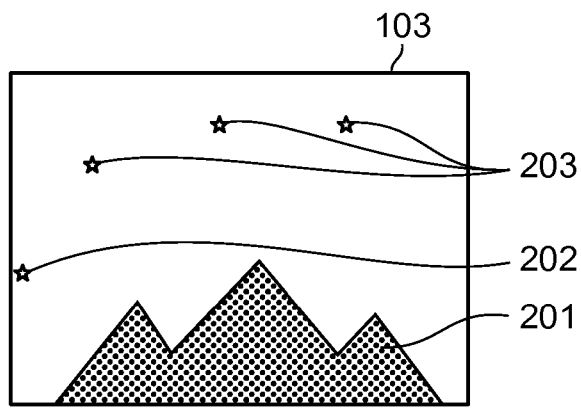
Figure 4C:
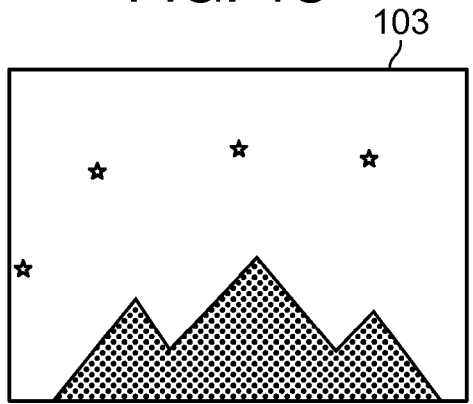
Figure 4D:
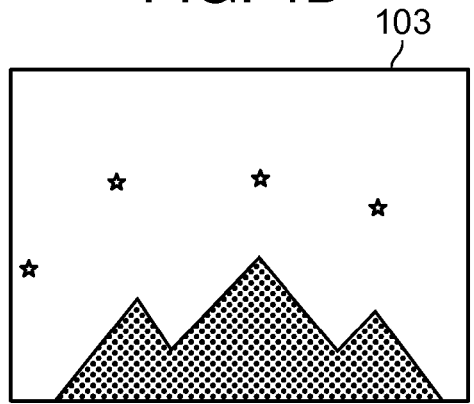
Figure 4E:
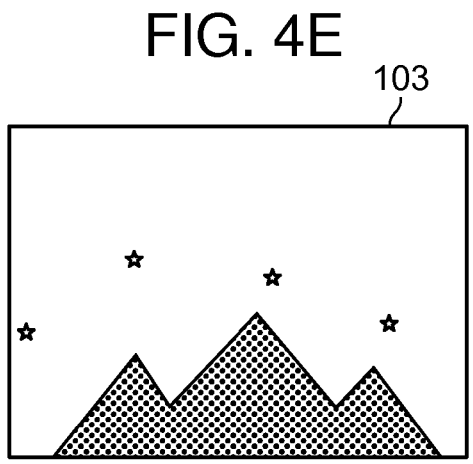
Figure 4F:
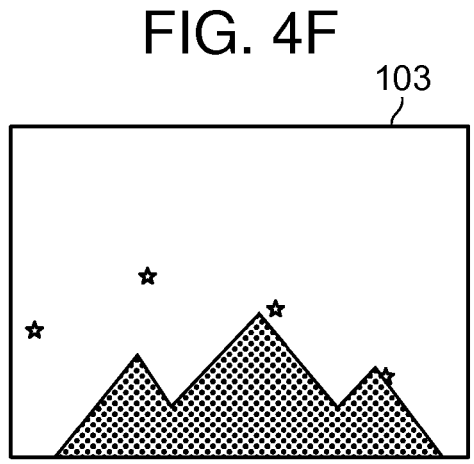

The image subtracting process of step S8 is performed to subtract the dark image 102 from the fundamental image 101 to remove the noise from the fundamental image 101, and to temporarily store the fundamental image 101 with the noise removed in a work area previously prepared in SDRAM 12. FIG. 3C is a view showing an example of an image 103 with noise removed (fundamental image 101 with the noise removed) obtained in the process at step S8.

As described above, the dark current noise 204 appearing in the fundamental image 101 is a fixed pattern noise of a reproducibility. Therefore, subjected to the process at step S8, the fundamental image 101 turns to the image 103 with noises reduced and in a good condition.

Thereafter, CPU 2 repeatedly performs the series of processes at step S6 to step S8 until the shooting operations have been performed a predetermined number "N" of times, that is, until "N" sheets of images with noise removed have been obtained (step S9). After the series of processes have been performed at step S6 to step S8, "N" sheets of images 103 with noise removed are temporarily stored in SDRAM 12. As shown in FIG. 4A to FIG. 4F, the plural stars 203 change their positions in the respective images 103.

When the shooting operations have been performed the predetermined number "N" of times to obtain "N" sheets of images (YES at step S9), CPU 2 repeatedly performs the following process on each of the images 103 with noise removed and the previous or next image.

At first, CPU 2 sets a variable "n" representing a set of two images to be processed (step S10). The initial value of the variable is "1". The variable is incremented by 2 every time the process is performed at step S10, that is, the variable takes an odd number, such as 3, 5, 7 and so on.

Figure 5A:
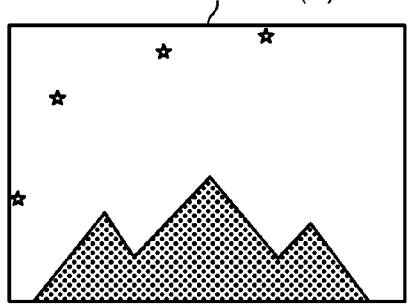
FIG. 5A is a view showing an example of the (n)-th image with noise removed.
Figure 5B:
FIG. 5B is a view showing an example of the (n+1)-th image with noise removed.
Figure 5C:
FIG. 5C is a view showing an example of a difference image.

Then, CPU 2 performs a subtracting process to subtract the (n+1)-th image G2 with noise removed from the (n)-th image G1 with noise removed, thereby producing a difference image G3 (step S11). FIG. 5A is a view showing an example of the (n)-th image G1 with noise removed. FIG. 5B is a view showing an example of the (n+1)-th image G2 with noise removed. FIG. 5C is a view showing an example of the difference image G3.

As shown in FIG. 5C, the motionless subjects such as the mountain 201 and the Pole Star 202 shown both in the (n)-th image G1 with noise removed and in the (n+1)-th image G2 with noise removed are deleted from the difference image G3. As a result, only the moving subjects such as the plural stars 203 shown both in the (n)-th image G1 with noise removed and in the (n+1)-th image G2 with noise removed are shown at different positions in the difference image G3.

Figure 5D:
FIG. 5D is a view showing an example of an additive image.

Then, CPU 2 performs an addition process to add the (n)-th image G1 with noise removed to the (n+1)-th image G2 with noise removed, thereby producing an additive image G4 as shown in FIG. 5D (step S12).

As shown in FIG. 5D, the additive image G4 consists of the motionless subjects such as the mountain 201 and the Pole Star 202 and the moving subjects in the diurnal motion, such as the plural stars 203. In the additive image G4, the motionless subjects such as the mountain 201 and the Pole Star 202 will double in brightness from the (n)-th image G1 with noise removed and the (n+1)-th image G2 with noise removed.

CPU 2 temporarily stores the difference image G3 and the additive image G4 in the work area of SDRAM 12.

Figure 5E:
FIG. 5E is a view showing an example of an image of a motionless subject.

Further, CPU 2 performs a subtracting process of extracting a difference between the difference image G3 and the additive image G4 to produce a motionless-subject image G5 as shown in FIG. 5E (step S13), and temporarily stores the motionless-subject image G5 in the work area of SDRAM 12.

In the motionless-subject image G5 shown in FIG. 5E, only the motionless subjects such as the mountain 201 and the Pole Star 202 will double in brightness from the (n)-th image G1 with noise removed and the (n+1)-th image G2 with noise removed.

Figure 5F:
FIG. 5F and FIG. 5G are views each showing an example of an image of a moving subject.

CPU 2 reduces the brightness of the motionless-subject image G5 to half, and subtracts the motionless-subject image G5 with brightness reduced to half from the (n)-th image G1 with noise removed, thereby producing a moving-subject image G6 as shown in FIG. 5F (step S14). As shown in FIG. 5F, only the moving subjects such as the plural stars 203 shown in the (n)-th image G1 with noise removed appear in the moving-subject image G6 at the same brightness level as the (n)-th image G1 with noise removed.

Figure 5G:

CPU 2 reduces the brightness of the motionless-subject image G5 to half, and subtracts the motionless-subject image G5 with brightness reduced to half from the (n+1)-th image G2 with noise removed, thereby producing a moving-subject image G7 as shown in FIG. 5G (step S15). As shown in FIG. 5G, only the moving subjects such as the plural stars 203 shown in the (n+1)-th image G2 with noise removed appear in the moving-subject image G7 at the same brightness level as the (n+1)-th image G2 with noise removed.

CPU 2 temporarily stores in the work area of SDRAM 12 the moving-subject images G6 and G7 produced in the process at step S14 and in the process at step S15, respectively.

Thereafter, CPU 2 returns to the process at step S10 to change the variable "n" and repeatedly performs the processes at step S11 to step S15 until all the sets of images equivalent to half of "N" sheets of shot images have been processed (NO at step S16).

In the case where the number "N" of shot images is not an even number but an odd number (not shown), CPU 2 combines the last (N)-th image with noise removed with the (N−1)-th image with noise removed to exceptionally make a set of the (N)-th image with noise removed and the (N−1)-th image with noise removed, and performs the similar process on the set of the images. In the following description, it is presumed for convenience sake that the number "N" of shot images is an even number.

When the above processes have been performed, the moving-subject images G6, G7 are produced, in which only the moving subjects such as the plural stars 203 are shown, and in total "N" sheets of moving-subject images G6, G7 are stored in SDRAM 12. In the following description, the moving-subject images G6, G7 are collectively referred to as the "series of moving-subject images". Also, "N/2" sheets of motionless-subject images G5 are stored in SDRAM 12, and in the motionless-subject image G5 only the motionless subjects such as the mountain 201 and the Pole Star 202 having a double brightness are shown.

Figure 6:
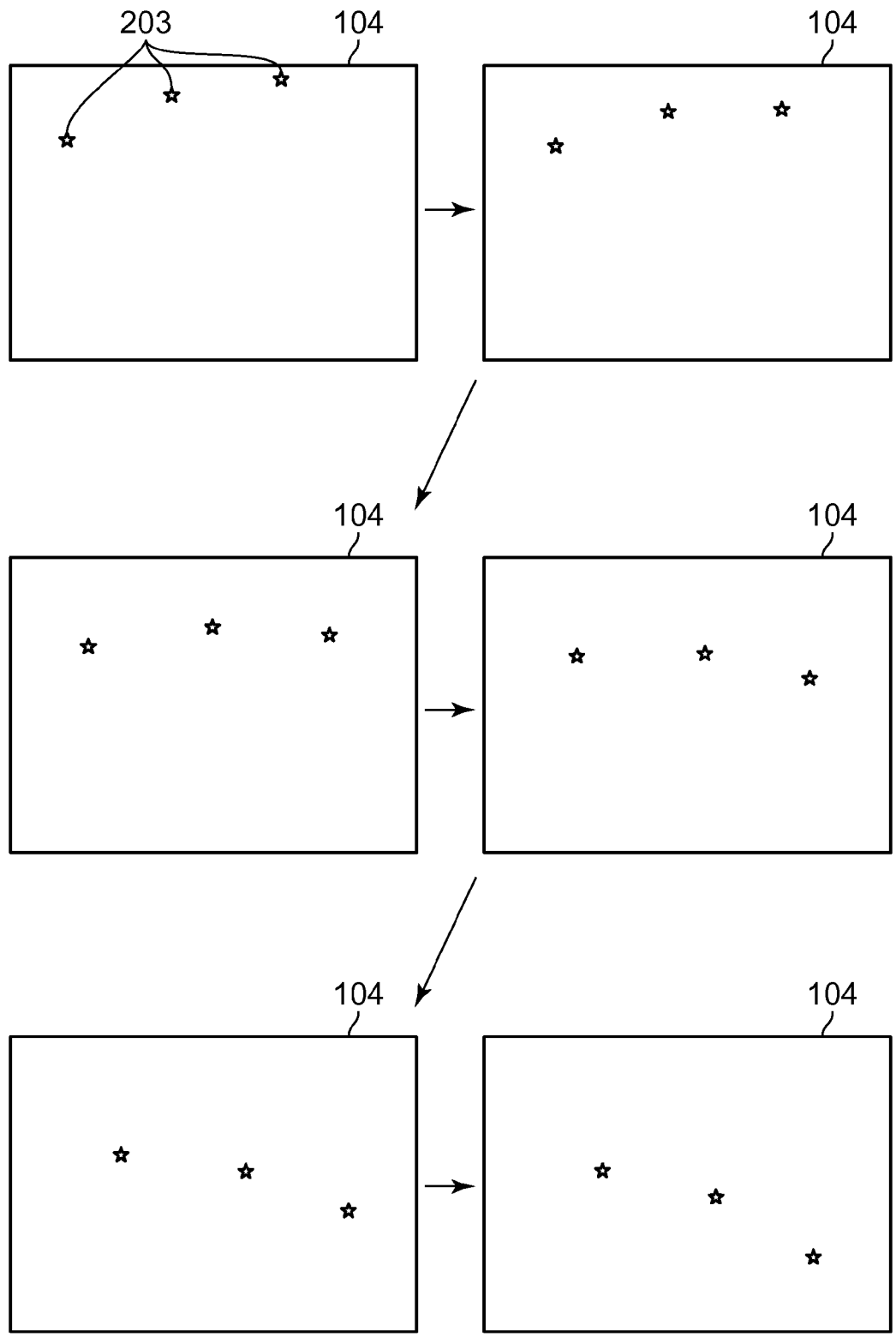
FIG. 6 is a view showing a series of moving-subject images, which are disposed in order of the relevant shooting operations.

FIG. 6 is a view showing portions (plural stars 203) of the series of moving-subject images 104, which are disposed in order of the relevant shooting operations. As shown in FIG. 6, the plural stars 203 shown in the series of moving-subject images 104 change their positions in the respective moving-subject images by moving distances due to the diurnal motion depending on the time differences between the shooting times (the times, at which the images are picked up respectively).

When all the sets of images equivalent to half of the number "N" of shot images have been processed (YES at step S16), CPU 2 performs the following processes.

CPU 2 calculates the "moving distances" of the plural stars 203 due to the diurnal motion using "N" sheets of moving-subject images 104 (step S17). In the calculation at step S17, among the "N" sheets of moving-subject images 104, CPU 2 uses as the reference image the moving-subject image 104 corresponding to the fundamental image, which has been shot at the reference time set at step S1, and calculates relative moving distances of the plural stars 203 from the positions in such reference image to the positions in the other moving-subject image 104.

More specifically, the movement of the plural stars 203 between the separate moving-subject images 104 is the diurnal motion, and is a rotational transfer about the Pole Star 202. Using a publicly known image processing technique, CPU 2 specifies a rotation center of the plural stars 203, and then calculates a relative rotation angle (moving distance) of each of the moving-subject images 104 about the rotation center using the reference image (reference moving-subject image) as the standard.

Figure 7A:
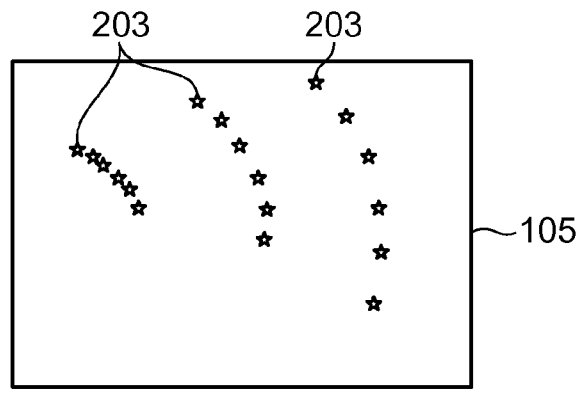
FIG. 7A is a view showing an example of a work image.

The rotation center of the plural stars 203 can be specified in the following manner. "N" sheets of moving-subject images 104 are combined together to produce a work image 105 as shown in FIG. 7A. In the work image 105, a transferring track of a star will be circular as shown in FIG. 7A. Then, the most clear circular transferring track of a star 203 is specified, and the center of the specified circular transferring track of a star 203 is obtained, whereby the rotation center is specified. In the case where the Pole Star 202 is not included within the angle of view when the shooting operation is performed, the rotation center will be found outside the image.

Figure 7B:
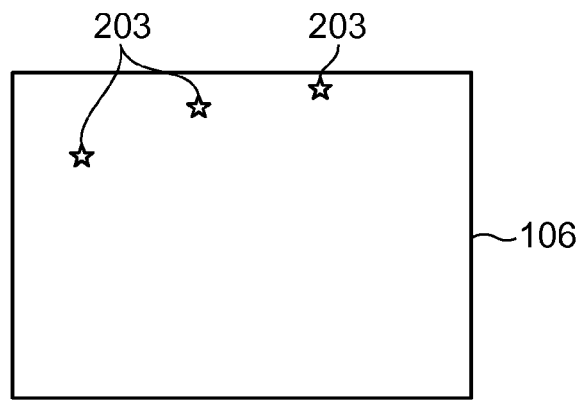
FIG. 7B is a view showing an example of a first composed image.

Then, CPU 2 aligns the plural moving-subject images 104 depending on the moving distances calculated at step S17 and superimposes the aligned moving-subject images 104 upon the moving-subject image 104 specified as the reference image to produce a first composed image 106, as shown in FIG. 7B (step S18). The first composed image 106 shows only the plural stars 203 having a sufficient brightness. The first composed image 106 shown in FIG. 7B is an example of an image, the reference time of which is the shooting-operation starting time, and which is produced based on the first moving-subject image 104 used as the reference image.

Figure 7C:
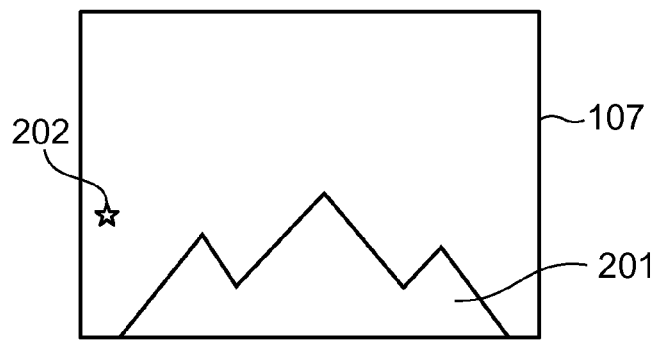
FIG. 7C is a view showing an example of a second composed image.

Further, CPU 2 adds "N"/2 sheets of motionless-subject images G5 together to produce a second composed image 107, as shown in FIG. 7C (step S19). The second composed image shows only the mountain 201 and the Pole Star 202 having a sufficient brightness.

Figure 7D:
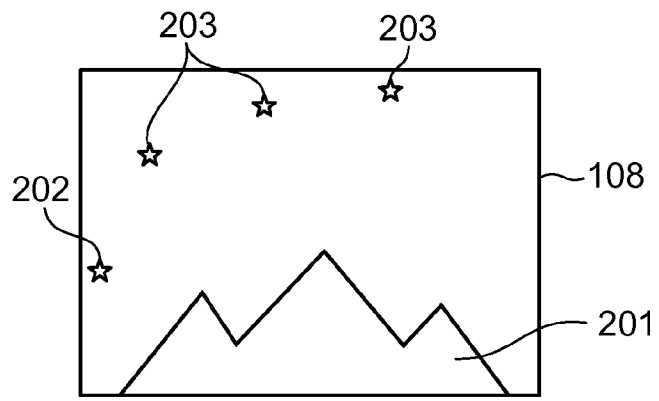
FIG. 7D is a view showing an example of a finally produced shot image.

Finally, CPU 2 combines the first composed image 106 with the second composed image 107 to produce a final shot image 108, as shown in FIG. 7D (step S20), and stores the final shot image 108 in the external memory 14 (step S21). The final shot image 108 shows the plural stars 203, mountain 201 and the Pole Star 202 having a sufficient brightness.

When shooting a starlit sky with the digital camera 1 according to the present embodiment of the invention, a shot image having substantially the same brightness as a correctly exposed image can be obtained in the starlit-sky shooting mode. Further, in the shot image obtained in the starlit-sky shooting mode, the moving subjects such as the plural stars obtained by the "successive-exposure image-pickup operation" are appropriately combined with the motionless subjects such as the mountains and the Pole Star.

In the digital camera 1 according to the present embodiment of the invention, the dark-current noises are removed from the plural images obtained by the "successive-exposure image-pickup operation" and the resultant images with noise removed are used to produce a shot image. Therefore, the shot image contains less noises and is improved in quality.

Further, in the digital camera 1 according to the present embodiment of the invention, before producing the final shot image, CPU 2 adds the (n)-th image G1 with noise removed to the (n+1)-th image G2 with noise removed to produce the additive image G4, and subtracts the (n+1)-th image G2 with noise removed from the (n)-th image G1 with noise removed to produce the difference image G3, and then subtracts the difference image G3 from the additive image G4, whereby the motionless subjects such as the mountains 201 and the Pole Star 202 are extracted from a set of two images with noise removed (refer to FIG. 5E). In this way, the image portions of the motionless subjects of the images can be obtained correctly and effectively.

Further, the motionless-subject image G5 produced by subtracting the difference image G3 from the additive image G4, is reduced in brightness to half. Then, the motionless-subject image G5 with brightness reduced to half is subtracted from the (n)-th image G1 with noise removed and also from the (n+1)-th image G2 with noise removed, whereby the moving subjects such as the plural stars 203 are extracted from the respective images with noise removed (refer to FIGS. 5F and 5G). In this way, the image portions of the moving subjects 203 of the images can be obtained correctly and efficiently.

In the digital camera 1 according to the present embodiment of the invention, when the user sets a reference clock time, this reference clock time is used as the shooting time for shooting an image, and this image is used as the reference image when the plural images are combined together. The positions of the moving subjects such as the plural stars 203 in the images shot at different shooting times are corrected to the positions corresponding to those in the image shot at the reference time and then the corrected images are combined together. Therefore, the user can obtain a shot image, which shows the plural stars 203 staying at the positions corresponding to the user's desired clock time.

Further, for instance, when the reference time is set to the shooting-operation starting time, the positions of the plural stars 203 at the time of shooting the first image will be the positions of the plural stars 203 in the finally composed shot image. Therefore, in this case, the live scene, which the user is actually confirming at the time of taking a picture will be obtained as the shot image.

Further, in the digital camera 1 according to the present embodiment of the invention, the moving-subject image 104 corresponding to the fundamental image shot at the reference time designated by the user is set as the reference image, and the plural stars of other moving-subject image 104 are combined with the plural stars 203 of the reference image. In the above description, the first image is used as the reference image, but the reference image is not limited to first image, and any image can be used as the reference image in the embodiment of the invention. For instance, the shooting operations are performed "N" times, and the image obtained by the last shooting operation and/or the image obtained by (N/2)-th shooting operation can be used as the reference image. Further, the image obtained by an arbitrary shooting operation can be also used as the reference image.

In the above description, the present invention has been described, which is applied to the shooting operation of the digital camera 1 performed to shoot a starlit sky in the starlit-sky shooting mode. That is, the invention has been described, which is applied to the shooting operation of shooting a subject in a dark area and moving objects showing an extremely slow movement within the angle of view. But the invention can be applied to the shooting operation of shooting a subject in a well-lighted area and moving objects showing an extremely quick movement within the angle of view. In these shooting operations, it is not always necessary to use a tripod and the like to hold the digital camera 1 and it is possible for the user to pickup an image holding the digital camera 1 with his or her hands. But since sometimes an image of a motionless subject cannot be picked up at a fixed position due to hand movement, a hand-movement compensating technique can compensate for hand movement, thereby permitting to pick up the motionless subject at the fixed position (reducing blurring the image of the motionless subject).

In the description of the embodiments of the invention, the successive-exposure image-pickup operation has been described, but the plural images, which have been obtained independently from each other can be used to be combined together, and when the combined image is too bright, it is possible to appropriately adjust the brightness of the combined image.

In the embodiments of the invention, the images picked up by means of the image pickup device 7 are combined together to produce a combined image. But other images, which are obtained by an external apparatus and received therefrom can be used in place of those obtained by the image pickup device 7 to produce the combined image.

Although specific embodiments of the invention and modifications have been described in the foregoing detailed description, variations and rearrangements may be made to the disclosed embodiments while remaining within the scope of obtaining operations and working-effects of the invention as defined by the following claims. It is intended to include all such modifications in the following claims and their equivalents.

While the present invention has been described with reference to the preferred embodiments, it is intended that the invention be not limited by any of the details of the description therein but includes all the embodiments and modifications which fall within the scope of the appended claims.

What is claimed is:

1. An image composing apparatus comprising:
   an image pickup device; and
   a processor which is configured to (i) control the image pickup device to continuously perform image-pickup operations plural times to obtain plural images each including a moving subject and a motionless subject, (ii) image portions of the moving subject from the plural images obtained by the image pickup device, wherein the image portions occupy different positions in the plural images, respectively, (iii) extract image portions of the motionless subject from the plural images obtained by the image pickup device, wherein the image portions occupy fixed positions in the plural images, respectively, and (iv) move the image portions of the moving subject extracted from the plural images, depending on the positions occupied by the image portions of the moving subject in the plural images, hold the image portions of the motionless subject at the fixed positions in the plural images, and combine the moved image portions of the moving subject with the image portions of the motionless subject held at the fixed positions to compose a shooting image.

2. The image composing apparatus according to claim 1, wherein the processor is configured to control the image pickup device to obtain the plural images with plural successive short-time exposures.

3. The image composing apparatus according to claim 1, wherein the processor is configured to produce the shooting image showing the moving subject and the motionless subject, both of which remain still.

4. The image composing apparatus according to claim 1, wherein the processor is configured to control the image picku device to continuously pick up the plural images at separate timings; and
   wherein the processor is configured to add a set of images continuously picked up at separate timings by the image pickup device to produce an additive image, subtract one image out of the set of images from another image out of the set of images to produce a difference image, and further subtract the difference image from the additive image, to extract the image portion of the motionless subject from each of the plural images obtained by the image pickup device.

5. The image composing apparatus according to claim 1, wherein the processor is configured to subtract the extracted image portion of the motionless subject from each of the plural images obtained by the image pickup device, thereby extracting the image position of the moving subject from each of the plural images obtained by the image pickup device.

6. The image composing apparatus according to claim 1, wherein the processor is configured to correct the positions of the image portions of the moving subject extracted from the respective images to the position of the image portion of the moving subject in a first image among the plural images continuously picked up by the image pickup device, and combines the corrected images together to compose the shooting image.

7. The image composing apparatus according to claim 1, wherein the processor is configured to set a time; and
   wherein the processor is configured to correct the positions of the image portions of the moving subject extracted from the respective images to a position corresponding to a time set by the time setting unit, and combines the corrected images together to compose the shooting image.

8. The image composing apparatus according to claim 2, further comprising:
   a mechanical shutter;
   wherein the processor is configured to control the image pickup device to obtain plural noise images picked up with the mechanical shutter closed during a shooting operation with the plural successive short-time exposures; and
   wherein the processor is configured to subtract the plural noise images from the plural images to remove dark current noise from said plural images, before extracting the image portions of the moving and motionless subjects.

9. The image composing apparatus according to claim 1, wherein the processor is configured to compensate for fluctuations of images obtained by the image pickup device due hand movement;
   wherein the processor is configured to compensate for fluctuations due to hand movement of the image portions of the motionless subject extracted from the respective images; and
   wherein the processor is configured to combine the hand-movement compensated image portions of the motionless subject held at the fixed positions together when producing the shooting image.

10. An image composing method in an apparatus having an image pickup device which is controlled to continuously perform image-pickup operations plural times to obtain plural images each including a moving subject and a motionless subject, the method comprising:
    extracting image portions of the moving subject from the plural images obtained by the image pickup device, wherein the image portions occupy different positions in the plural images, respectively;
    extracting image portions of the motionless subject from the plural images obtained by the image pickup device, wherein the image portions occupy fixed positions in the plural images, respectively; and
    moving the image portions of the moving subject extracted from the plural images, depending on the positions occupied by the image portions of the moving subject in the plural images, maintaining the image portions of the motionless subject at the fixed positions in the plural images, and combining the moved image portions of the moving subject with the image portions of the motionless subject held at the fixed positions to compose a shooting image.

11. A non-transitory computer readable recording medium having a program stored thereon that is executable by a computer of an apparatus that comprises an image pickup device which is controlled by the computer to continuously performing shooting operations plural times to obtain plural images each including a moving subject and a motionless subject, the program being executable by the computer to perform functions comprising:
    extracting image portions of the moving subject from the plural images obtained by the image pickup device, wherein the image portions occupy different positions in the plural images, respectively;
    extracting image portions of the motionless subject from the plural images obtained by the image pickup device, wherein the image portions occupy fixed positions in the plural images, respectively; and
    moving the image portions of the moving subject extracted from the plural images, depending on the positions occupied by the image portions of the moving subject in the plural images, maintaining the image portions of the motionless subject at the fixed positions in the plural images, and combining the moved image portions of the moving subject with the image portions of the motionless subject held at the fixed positions to compose a shooting image.

* * * * *

UNITED STATES PATENT AND TRADEMARK OFFICE
CERTIFICATE OF CORRECTION

PATENT NO. : 9,041,821 B2
APPLICATION NO. : 13/791504
DATED : May 26, 2015
INVENTOR(S) : Motoyuki Kashiwagi et al.

It is certified that error appears in the above-identified patent and that said Letters Patent is hereby corrected as shown below:

On the Title Page, Item (57) Abstract, line 14, change "mage" to --image--.

IN THE CLAIMS

Column 10, claim 1, line 30, after "(ii)" insert --extract--.

Column 10, claim 4, line 53, change "picku" to --pickup--.

Signed and Sealed this
Twenty-second Day of December, 2015

Michelle K. Lee
*Director of the United States Patent and Trademark Office*